United States Patent
Jiang et al.

(10) Patent No.: US 11,113,427 B2
(45) Date of Patent: Sep. 7, 2021

(54) METHOD OF DISPLAYING CONTENTS, A FIRST ELECTRONIC DEVICE AND A SECOND ELECTRONIC DEVICE

(71) Applicant: Lenovo (Beijing) Co., Ltd., Beijing (CN)

(72) Inventors: Xin Jiang, Beijing (CN); Juan David Hincapie-Ramos, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 257 days.

(21) Appl. No.: 16/231,850

(22) Filed: Dec. 24, 2018

(65) Prior Publication Data
US 2019/0197262 A1    Jun. 27, 2019

(30) Foreign Application Priority Data

Dec. 22, 2017    (CN) .......................... 201711402577.5

(51) Int. Cl.
*G06F 21/84*    (2013.01)
*G06F 3/01*    (2006.01)

(52) U.S. Cl.
CPC .............. *G06F 21/84* (2013.01); *G06F 3/012* (2013.01); *G06F 3/013* (2013.01)

(58) Field of Classification Search
CPC ........... G06F 21/84; G06F 3/012; G06F 3/013
See application file for complete search history.

(56) References Cited

U.S. PATENT DOCUMENTS

| | | | | |
|---|---|---|---|---|
| 10,242,501 B1* | 3/2019 | Pusch | ..................... | H04N 19/43 |
| 10,551,991 B2* | 2/2020 | Yao | ......................... | G06F 3/011 |
| 10,860,100 B2* | 12/2020 | Osterhout | ............... | G06F 1/163 |
| 10,884,525 B1* | 1/2021 | Vonsik | ..................... | G06F 3/012 |
| 2003/0085866 A1* | 5/2003 | Bimber | ................ | G05B 19/186 |
| | | | | 345/156 |
| 2015/0205106 A1* | 7/2015 | Norden | ................ | G02B 27/017 |
| | | | | 345/7 |
| 2016/0026253 A1* | 1/2016 | Bradski | ................ | H04N 13/344 |
| | | | | 345/8 |
| 2016/0117861 A1* | 4/2016 | Liu | ....................... | G01C 21/365 |
| | | | | 345/633 |

(Continued)

FOREIGN PATENT DOCUMENTS

| CN | 103077361 A | 5/2013 |
|---|---|---|
| CN | 104749980 A | 7/2015 |

(Continued)

*Primary Examiner* — Oleg Korsak
(74) *Attorney, Agent, or Firm* — Anova Law Group, PLLC

(57) ABSTRACT

The present disclosure provides a method for processing display contents, a first electronic device, and a second electronic device thereof. The method of displaying contents includes the steps of: providing a first electronic device configured to display one or more virtual contents to a user, wherein the first electronic device is communicable with and coupled to a second electronic device, which includes a physical display configured to display one or more non-virtual contents; determining the user's line of sight; and prohibiting the physical display of the second electronic device from displaying the one or more non-virtual contents, in response to the user's line of sight not being on the physical display of the second electronic device.

17 Claims, 8 Drawing Sheets

(56) References Cited

U.S. PATENT DOCUMENTS

| | | | | |
|---|---|---|---|---|
| 2016/0187970 A1* | 6/2016 | Ashforth | .................. | G06F 3/013 |
| | | | | 345/8 |
| 2016/0358181 A1* | 12/2016 | Bradski | .................. | G06F 3/011 |
| 2017/0123492 A1* | 5/2017 | Marggraff | .............. | H04N 5/247 |
| 2017/0269685 A1* | 9/2017 | Marks | .................... | A63F 13/212 |
| 2018/0157333 A1* | 6/2018 | Ross | ........................ | H04L 67/38 |
| 2018/0189568 A1* | 7/2018 | Powderly | .............. | G06T 19/006 |
| 2018/0190003 A1* | 7/2018 | Upadhyay | ............ | G06T 19/003 |
| 2018/0197624 A1* | 7/2018 | Robaina | ................. | G16H 80/00 |
| 2018/0293798 A1* | 10/2018 | Energin | ................. | G06F 3/012 |
| 2018/0300952 A1* | 10/2018 | Evans | .................. | G06F 3/04845 |
| 2018/0307303 A1* | 10/2018 | Powderly | ................ | G06F 3/017 |
| 2019/0018498 A1* | 1/2019 | West | ..................... | G06T 19/006 |
| 2019/0094981 A1* | 3/2019 | Bradski | .................... | G06F 3/011 |
| 2019/0188895 A1* | 6/2019 | Miller, IV | ............. | G06F 3/0304 |
| 2019/0236836 A1* | 8/2019 | Mallinson | ................ | G06N 5/04 |
| 2019/0362557 A1* | 11/2019 | Lacey | .................... | G06F 3/012 |
| 2019/0377487 A1* | 12/2019 | Bailey | .................. | G06F 3/0346 |
| 2020/0090401 A1* | 3/2020 | Terrano | .................... | G06F 3/013 |
| 2020/0192622 A1* | 6/2020 | Stoyles | .................... | G06F 3/017 |
| 2020/0301513 A1* | 9/2020 | Mejia Cobo | ............ | G06F 3/005 |

FOREIGN PATENT DOCUMENTS

| | | | |
|---|---|---|---|
| CN | 106650467 A | 5/2017 | |
| CN | 107168513 A | 9/2017 | |
| CN | 107194288 A | 9/2017 | |

\* cited by examiner

METHOD OF DISPLAYING CONTENTS, A FIRST ELECTRONIC DEVICE AND A SECOND ELECTRONIC DEVICE

CROSS-REFERENCES TO RELATED APPLICATIONS

This application claims the priority to Chinese Patent Application No. 201711402577.5, entitled "A Method for Processing Display Contents, a First Electronic Device, and a Second Electronic Device," filed on Dec. 22, 2017, the entire content of which is incorporated herein by reference.

FIELD OF TECHNOLOGY

The present disclosure relates to the field of communication technologies. More specifically, the present disclosure relates to a method for processing display contents, a first electronic device, and a second electronic device.

BACKGROUND

With the development of communication technologies, electronic devices are becoming more and more powerful, and users can use these devices to run many applications using the corresponding application interfaces displayed on the display of the electronic devices. For example, the display may be used to display a chat interface, a web browser interface, a word document interface, etc. Because the display is constantly displaying the corresponding application interfaces, other people can see these application interfaces as well, which compromises the user's privacy.

BRIEF SUMMARY OF THE DISCLOSURE

The present disclosure provides a method for processing display contents, a first electronic device, and a second electronic device to provide privacy protection to contents displayed on electronic devices in a timely manner.

One aspect of the present disclosure provides a method of displaying contents. The method includes the steps of providing a first electronic device configured to display one or more virtual contents to a user, wherein the first electronic device is communicable with and coupled to a second electronic device, which includes a physical display configured to display one or more non-virtual contents; determining the user's line of sight; and prohibiting the physical display of the second electronic device from displaying the one or more non-virtual contents, in response to the user's line of sight not being on the physical display of the second electronic device.

Another aspect of the present disclosure provides another method for processing display contents. The method includes the steps of displaying one or more virtual displays using an optical lens device of a first electronic device, the first electronic device being connected to a second electronic device with a physical display; determining a user's line of sight are on the physical display; and prohibiting the physical display of the second electronic device from displaying one or more application interfaces.

Another aspect of the present disclosure provides an electronic device, coupled to and communicable with a second electronic device having a physical display configured to display one or more non-virtual contents. The electronic device comprises a processor; and an optical lens device coupled to the processor, wherein the optical lens device is configured to display one or more virtual contents. The optical lens device is configured to determine a user's line of sight; and in response to the user's line of sight not being on the physical display of the second electronic device, to prohibit the physical display of the second electronic device from displaying the one or more non-virtual contents.

As disclosed in the above embodiments, the present disclosure provides a method for processing display contents, a first electronic device, and a second electronic device. The first electronic device may acquire one or more projection direction parameters that indicate a user's line of sight. If the projection direction parameters indicate the attention position corresponding the user's line of sight is not on a physical display, then the user is not currently looking at the physical display, and a first instruction will be generated. The first instruction is used to prohibit the physical display from displaying one or more application interfaces, so that other users may not see the one or more application interfaces on the physical display. In some embodiments, the one or more application interfaces may be blocked immediately. As such, the user's privacy may be protected in a timely manner.

BRIEF DESCRIPTION OF THE DRAWINGS

For a more complete understanding of the present disclosure, and the advantages thereof, reference is now made to the following descriptions to be taken in conjunction with the accompanying drawings. The accompanying drawings in the following description show merely some embodiments of the present disclosure, and a person of ordinary skill in the art may still derive other drawings from these accompanying drawings without creative efforts.

DETAILED DESCRIPTION

Figure 1:
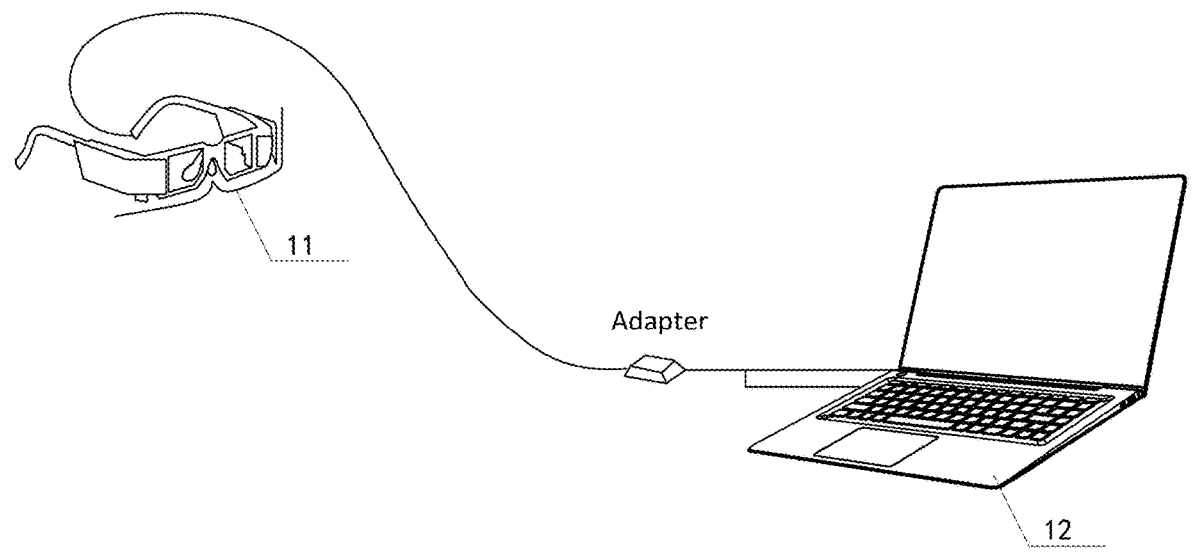
FIG. 1 is a schematic illustrating a connection between a first electronic device and a second electronic device according to an embodiment of the present disclosure.

Hereinafter, aspects, features, and embodiments of the present disclosure will be described with reference to the accompanying drawings. It should be understood that such description is exemplary only but is not intended to limit the scope of the present disclosure. In addition, it will be understood by those skilled in the art that various modifications in form and details may be made therein without departing from the spirit and scope of the present disclosure.

The accompanying drawings illustrating embodiments of the present disclosure along with the summary of disclosure provided above and the detailed description provided below serve to explain the concepts of the present disclosure.

Features and aspects of the present disclosure will become apparent with reference to the accompanying drawings and non-limiting examples describing various preferred embodiments of the present disclosure.

It will also be appreciated that although the present disclosure has been described with reference to some specific examples, equivalents of the present disclosure can be achieved by those skilled in the art. These equivalents having features claimed in the present disclosure should fall within the scope of protection defined hereinafter.

Hereinafter, embodiments of the present disclosure will be described with reference to the accompanying drawings. It should be understood that such description is exemplary only but is not intended to limit the scope of the present disclosure. In addition, in the following description, descriptions of well-known structures and techniques are omitted to avoid unnecessarily obscuring the concepts of the present disclosure. Therefore, specific structural and functional details disclosed herein are not intended to be limiting, but are merely used as a basis of the claims to teach those skilled in the art to use the present disclosure in various combinations.

The terms used herein is for the purpose of describing particular embodiments only but is not intended to limit the present disclosure. The words "a", "an" and "the" as used herein should also cover the meanings of "a plurality of" and "a variety of", unless the context clearly dictates otherwise. In addition, the terms "comprising", "including", "containing" and the like as used herein indicate the presence of the features, steps, operations and/or components, but do not preclude the presence or addition of one or more other features, steps, operations or components.

The phrases "in an embodiment", "in another embodiment", "in another embodiment", or "in other embodiments" may refer to the same or different embodiments accordingly to the present disclosure.

Currently, the contents displayed on the electronic device may be protected by putting the electronic device under the screen saver mode after detecting a user has not used the device in a predetermined timeframe. However, since the electronic device will still display the corresponding application interfaces within the predetermined timeframe, the user's privacy may be not protected in a timely manner. Embodiments of the present disclosure protect the contents displayed on the electronic device in a timely manner, improving system security and user experiences.

In the present disclosure, a module may refer to a hardware component, a software component, or a combination thereof. In one embodiment, a module may include computer executable instructions stored in computer readable media. When executed by one or more processors, the computer executable instructions may implement certain functions correspond to the module. Further, the software component (e.g., computer executable instructions stored in a computer readable medium) may work together with one or more hardware components (e.g., a sensor, or a lens, etc.) to implement the functions of the module.

The embodiments of the display contents processing method according to the present disclosure may be applied to a first electronic device or a second electronic device.

The first electronic device may be a wearable electronic device, such as a head-mounted display. Further, the first electronic device may include a lens module, and the lens module may display one or more virtual displays.

The second electronic device may be an electronic device such as a desktop computer, a mobile terminal (e.g., smart phones or notebook computers), or iPad, etc. Further, the second electronic device may include a physical display, and one or more application interfaces displayed on the physical display may be displayed on the one or more virtual displays from the first electronic device. That is, the virtual displays may be the extended displays of the physical display.

The first electronic device may be connected to the second electronic device. The first electronic device 11 may be connected to the second electronic device 12 through an adapter, Bluetooth, or Wi-Fi. The embodiment of the present disclosure does not specifically limit the connection method between the first electronic device and the second electronic device. In FIG. 1, the first electronic device 11 and the second electronic device is connected through an adapter.

Because the virtual displays are displayed using the lens module in the first electronic device, only the user wearing the first electronic device may see the virtual displays, and the user not wearing the first electronic device may not be able to see the virtual displays. On the other hand, the physical display may be seen by anybody, other people may see the user's private application interfaces through the physical display, and the user's privacy may be compromised.

In one embodiment, the user may be viewing one or more application interfaces displayed on the virtual displays, and the physical display is not being viewed; or the user may be chatting with other people, so neither the application interfaces on the virtual displays nor the application interfaces on the physical display may be viewed. In this case, the attention position of the user's line of sight may not be on the physical display, and the first electronic device may generate a first instruction to prohibit the physical display from displaying one or more application interfaces. In the present disclosure, the attention position of the user's line of sight may sometimes also be referred as the user's line of sight.

In summary, the second electronic may prohibit the physical display from displaying one or more application interfaces in response to the user not viewing the application interfaces on the physical display. In one embodiment, one or more privacy application interfaces may be prohibited from displaying on the physical display to protect the user's privacy.

Figure 2:
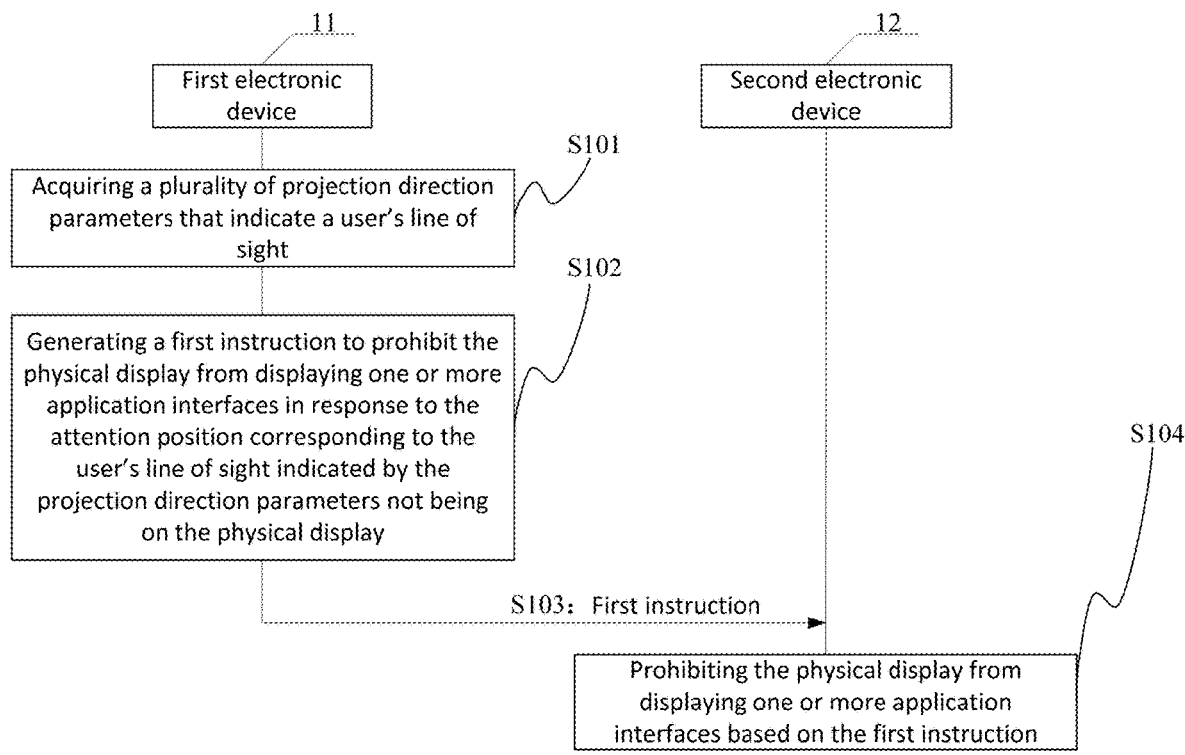
FIG. 2 is a signal diagram illustrating a method for processing display contents using the first electronic device according to an embodiment of the present disclosure.

The following embodiments are provided to describe the display contents processing method provided in the present disclosure. As shown in FIG. 2, a signal diagram is provided to illustrate the display contents processing method using the first electronic device according to an embodiment of the present disclosure. The method includes the following steps.

Step S101, electronic device 11 acquires one or more projection direction parameters that indicate a user's line of sight.

There are many methods to acquire the projection direction parameters. The present disclosure provides the following non-limiting methods.

In the first method, the first electronic device may include a near-infrared sensor (NIR sensor). When the user wears the first electronic device, such as a head-mounted electronic device, the infrared light from the NIR sensor may illuminates the user's eyes, the iris of the eyes may reflect the light from the infrared light, and the NIR sensor may detect the reflected light and identify the positional parameters of the user's eyeballs. The positional parameters may include the specific positions and directions of the eyeballs, thereby acquiring the projection direction parameters.

More specifically, the method may include acquiring the coordinates of the user's eyeballs on a first predetermined plane, and acquiring the angles between the user's eyeballs and a first predetermined direction.

Figure 3A:
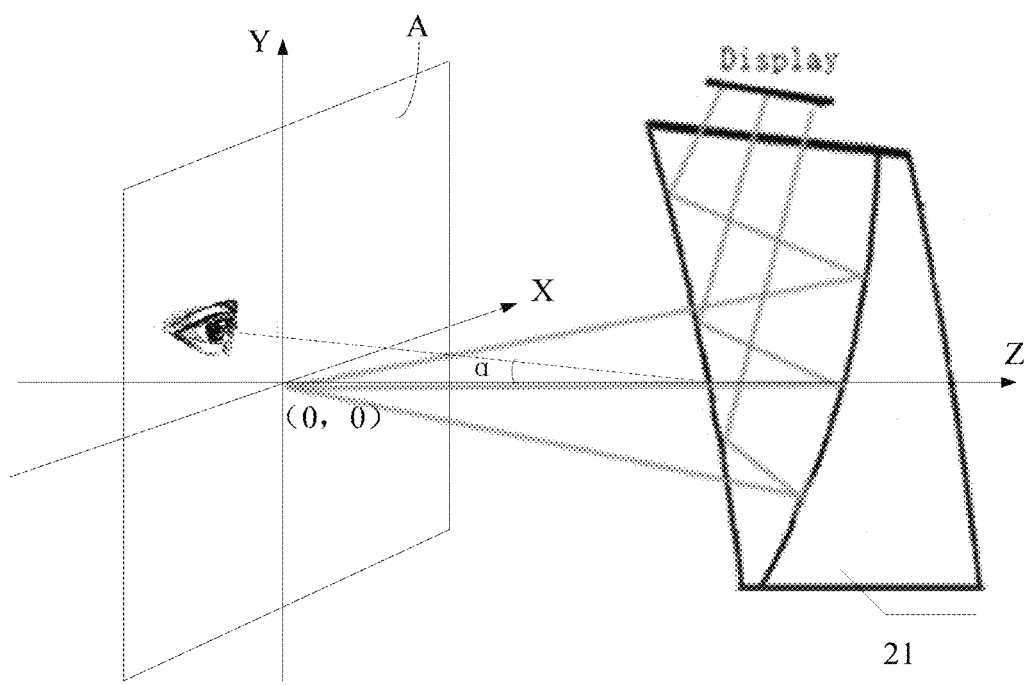
FIG. 3a is a schematic illustrating the acquisition of the project direction parameters according to an embodiment of the present disclosure.

FIG. 3a is a schematic illustrating the acquisition of the projection direction parameters according to an embodiment of the present disclosure. The first electronic device may include a MEMS sensor 21, and the Display in FIG. 3a may be a NIR sensor. According to the present embodiment, a first predetermined plane may be predefined. For example, the first predetermined plane may be plane A that is perpendicular to a reference light emitted by the first electronic device, the intersection of the light emitted by the first electronic device on the first predetermined plane may be defined as the origin (0, 0), the projection positions of the light reflected by the iris on the first predetermined plane may be detected by the NIR sensor to identify the coordinates of the user's eyeballs on the first predetermined plane. For example, in FIG. 3, the position of the user's eyeballs may be at (−1, 1) located in the first quadrant of plane A.

Further, in the first method, the angles between the user's eyeballs and the first predetermined direction may also be acquired. In one embodiment, the first predetermined direction may be defined as the direction of the light emitted by the first electronic device, such as the horizontal direction in FIG. 3. As shown in FIG. 3, the angle between the user's eyeball and the first predetermined direction is a.

It should be noted that the foregoing definitions of the present embodiment are for illustrative purposes only, and the present disclosure is not limited to the above-described method for defining a predetermined direction and acquiring a user's eyeball coordinates. For example, the plane of the virtual scene displayed by the first electronic device may be defined as the first predetermined plane. In this case, the coordinates of the user's eyeball will be the projection position of the user's eyeball on the first predetermined plane.

In the second method, the projection direction parameters may be acquired using the viewing angle tracking technique.

The projection direction parameters may be acquired by using the viewing angle tracking technique to acquire the projection directions and the positional parameters of the user's eyeballs, or the viewing angle tracking technique may be used to acquire the positional parameters and the rotation angles of the optical lens module.

The optical lens module projects light into the user's eyes so that the user may see the virtual displays. When the user's line of sight changes, the rotation angle and the position of the optical lens module may change as well. Therefore, the projection angle parameters may be acquired by using the rotation angles and positional parameters of the optical lens module.

In the third method, the projection direction parameters may be acquired using the Simultaneous Localization and Mapping (SLAM) algorithm.

The position of the physical display and the rotation angles of the optical lens module in the first electronic device may be acquired and detected in real time by using the SLAM algorithm.

In the fourth method, the user's head movement may be tracked, and the user's line of sight may be acquired based on the user's head movement. Under this method, the first electronic device may be an electronic device worn on a user's head. In one embodiment, the first electronic device may include several motion detection sensors such as acceleration sensors, and the motion detection sensors may detect the movements of the user's head by detecting the movements of the first electronic device and the user's line of sight may be identified by combining the relative positional relationship between the user's head and the first electronic device, with the detected motion status information.

Step S102, the first electronic device 11 generates a first instruction to prohibit the physical display from displaying one or more application interfaces in response to the attention position corresponding to the user's line of sight indicated by the projection direction parameters not being on the physical display.

Step S103, the first electronic device 11 transmits the first instruction to a second electronic device.

In one embodiment, the first instruction may be the instruction to control the second electronic device, or the second electronic device may generate a control instruction based on the first instruction.

In one embodiment, the first instruction may be the first instruction to instruct the physical display controlled by the second electronic device to enter a screen saver mode or a blank screen mode; or, the first instruction may be the first instruction to instruct the second electronic device to display a blocking image on the one or more application interfaces displayed on the physical display, or the first instruction may be the first instruction to instruct the second electronic device to display the blocking image on one or more private application interfaces with one or more privacy attributes displayed on the physical display.

FIGS. 3b-3f are schematics illustrating a use case of the method for processing display contents according to an embodiment of the present disclosure.

Figure 3B:
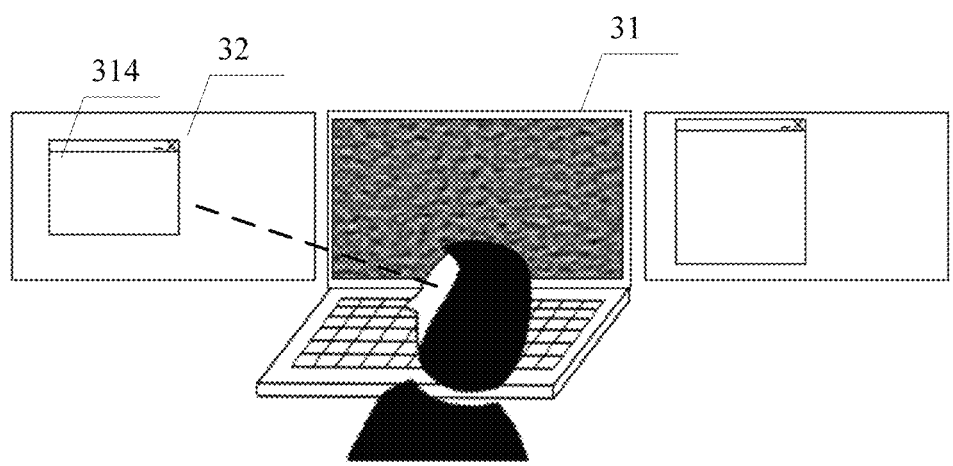
FIGS. 3b-3f are schematics illustrating a use case of the method for processing display contents according to an embodiment of the present disclosure.

FIG. 3b illustrates an example where the user's line of sight is on the left virtual display 31. In this case, the attention position corresponding to the user's line of sight (as shown by the dotted line) is not on the physical display 31.

Figure 3C:
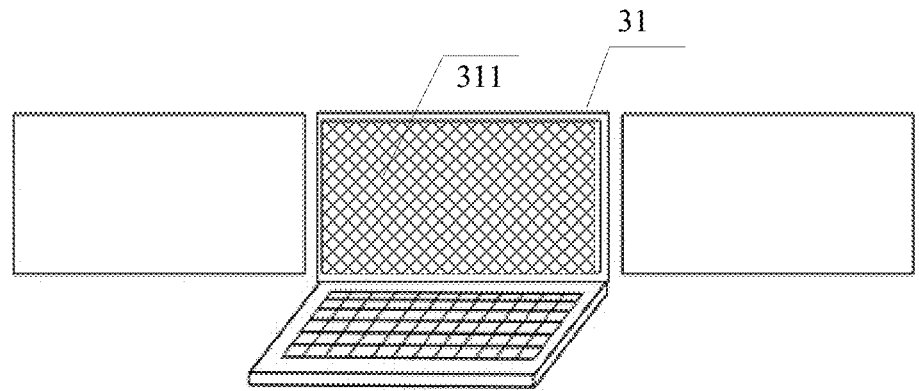

In one embodiment, the physical display 31 of the second electronic device may enter the screen saver mode or the blank screen mode. As shown in FIG. 3b, the entire physical display may display an image corresponding to the screen saver mode or an image corresponding to the blank screen mode. Further, the physical display 31 of the second electronic device may display a blocking image, and the second may or may not be in the screen saver mode or the blank screen mode. As shown in FIG. 3c, the entire physical display 31 may display a blocking image 311.

Figure 3D:
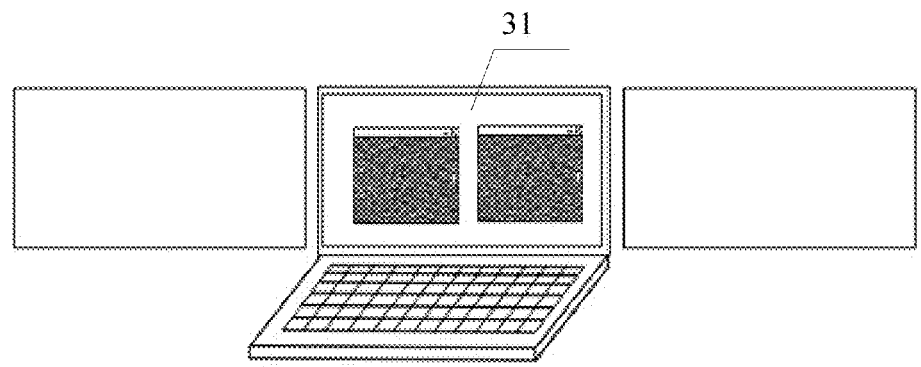

In one embodiment, the physical display 31 of the second electronic device may only display the blocking image on the application interfaces. As shown in FIG. 3d, the physical display 31 of the second electronic device may not display the blocking image on the entire display, rather the display image may be only displayed on the application interfaces. The physical display 31 in FIG. 3d displays two application interfaces, the blocking image is only displayed on the two application interfaces, and the blocking image is not displayed on areas where an application interface is not displayed.

Figure 3E:
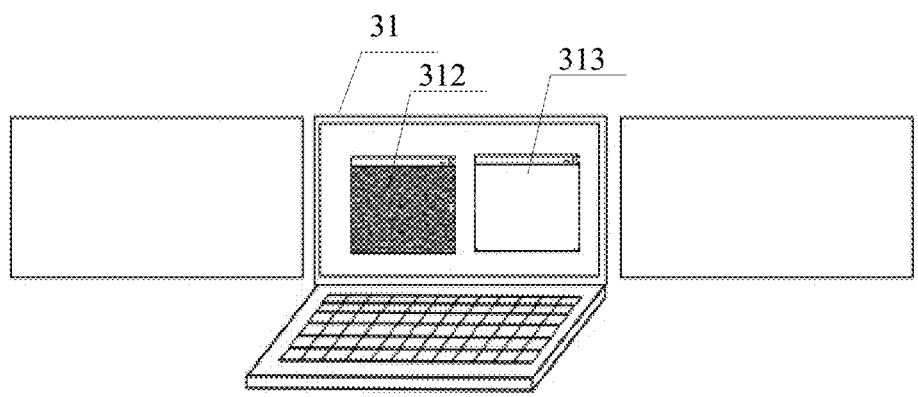

In another embodiment, the physical display 31 of the second electronic device may display the blocking image on private application interfaces with the privacy attributes. As shown in FIG. 3e, the physical display 31 displays two application interfaces, where application interface 312 may include the privacy attributes, and application interface 313 may not include the privacy attributes. Therefore, the physical display 31 of the second electronic device may display the blocking image on application interface 312, and the blocking image may not be displayed on application interface 313.

Figure 3F:
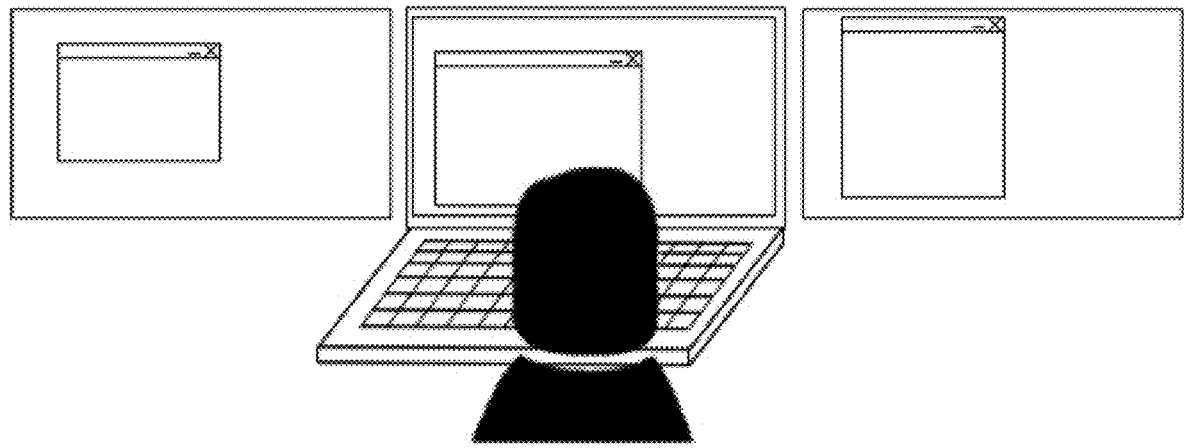

In one embodiment, the method may further include generating a second instruction to instruct the physical display controlled by the second electronic device to enter a bright screen mode in response to the attention position corresponding to the user's line of sight indicated by the projection direction parameters being on the physical display. As shown in FIG. 3f, if the physical display is displaying a private application interface with the privacy attributes, other people will be able to view the private application interface as well.

In one embodiment, the method may further include generating the second instruction to instruct the second electronic device to remove the blocking image displayed on the application interfaces on the physical display in response to the attention position corresponding to the user's line of sight indicated by the projection direction parameters being on the physical display. As shown in FIG. 3f, if the physical display is displaying a private application interface with the privacy attributes, other people will be able to view the private application interface as well.

In one embodiment, the method may further include generating the second instruction to instruct the second electronic device to remove the blocking image displayed on the private application interfaces with the privacy attributes on the physical display in response to the attention position corresponding to the user's line of sight indicated by the projection direction parameters being on the physical display. As shown in FIG. 3f, if the physical display is displaying a private application interface with the privacy attributes, other people will be able to view the private application interface as well.

In one embodiment, the method may further include generating the first instruction to instruct the second electronic device to display the blocking image on the private application interfaces with the privacy attributes on the physical display in response to the attention position corresponding to the user's line of sight indicated by the projection direction parameters being on the physical display. As shown in FIG. 3f, if the physical display is displaying a private application interface with the privacy attributes, other people will be able to view the private application interface as well. As shown in FIG. 3e, whether the attention position corresponding to the user's line of sight may be on the physical display or not, the blocking image may be constantly displayed on the private application interfaces with the privacy attribute on the physical display 31. Hence, the user may only be able to view the private application interfaces with the privacy attributes on the virtual displays, and other people may not able to view the private application interfaces with the privacy attributes.

Step S104, the second electronic device 12 prohibits the physical display from displaying one or more application interfaces based on the first instruction.

More specifically, the second electronic device 12 may generate a privacy protection instruction based on the first instruction, and prohibit the physical display from displaying one or more application interfaces based on the privacy protection instruction. Further, the second electronic device may take the first instruction as the privacy protection instruction, and prohibit the physical display from displaying one or more application interfaces based on the privacy protection instruction.

In one embodiment, the first instruction may be the first instruction used to instruct the physical display controlled by the second electronic device to enter a screen saver mode or a blank screen mode, in this case, the privacy protection instruction may be the instruction to control the physical display to enter the screen saver mode or the blank screen mode.

In one embodiment, the first instruction may be the first instruction used to instruct the second electronic device to display a blocking image on the one or more application interfaces displayed on the physical display, in this case, the privacy protection instruction may be the instruction to control the physical display to display the blocking image.

In one embodiment, the first instruction may be the first instruction used to instruct the second electronic device to display the blocking image on one or more private application interfaces with one or more privacy attributes displayed on the physical display, in this case, the privacy protection instruction may be the instruction to control the physical display to display the blocking image on the private application interfaces with the privacy attributes.

As disclosed in the above embodiments, the present disclosure provides a method for processing display contents, a first electronic device, and a second electronic device. The first electronic device may acquire one or more projection direction parameters that indicate a user's line of sight; if the projection direction parameters indicate the attention position corresponding the user's line of sight is not on a physical device, then the user is not currently looking at the physical display, and a first instruction will be generated. The first instruction is used to prohibit the physical display from displaying one or more application interfaces, so other users may not see the one or more application interfaces on the physical display, and the one or more application interfaces may be blocked immediately, so the user's privacy may be protected in a timely manner.

In one embodiment, the first instruction may be used to instruct the second electronic device to display a blocking image on private application interfaces with privacy attributes on the physical display. In particular, the second electronic device 12 may generate a privacy protection instruction based on the first instruction and may further include:

Determining whether a private application interface with the privacy attributes is displayed on the physical display or not in response to the second electronic device 12 receiving the first instruction. In response to a private application interface with the privacy attributes is displayed on the physical display, generate the privacy protection instruction to display a blocking image on the private application interface with the privacy attributes. In response to a private application interface with the privacy attributes is not displayed on the physical display, no action may be taken.

In one embodiment, since the first instruction may be generated and transmitted to the second electronic device 12 when the first electronic device 11 identifies the attention position corresponding to the user's line of sight is not on the physical display based on the projection direction parameters, the first instruction may only be applicable when a private application interface with the privacy attributes is displayed on the physical display of the second electronic device 12. The following method may prohibit the first electronic device 11 from generating the first instruction when the private application interface with the privacy attributes is not displayed on the physical display of the second electronic device 12.

An embodiment of generating the first instruction in response to the attention position corresponding to the user's line of sight indicated by the projection direction parameters not being on the physical display is provided below.

The first electronic device 11 may acquire a privacy indication instruction from the second electronic device 12 in response to the attention position corresponding to the user's line of sight indicated by the projection direction parameters not being on the physical display. The privacy indication instruction may be used to indicate whether the physical display has one or more private application interfaces or not, and the first electronic device 11 may generate the first instruction in response to the privacy indication instruction indicating one or more private application interfaces is displayed on the physical display. Subsequently, upon receiving the first instruction, the second electronic device may control the physical display to display a blocking image on one or more private application interfaces.

There are many methods to identify whether an application interface displayed on the physical display of the second electronic device 12 is a private application interface or not. The present disclosure provides the following non-limiting methods:

The first method involves determining whether the application corresponding to the application interface contains one or more privacy attributes or not. For example, the application interface may be a Word application interface, and the corresponding application may be Word. The attributes of Word may include a read-only attribute, a hidden attribute, and an encrypted attribute. If one or more of the attributes is selected, then the Word may be determined to contain the privacy attributes. On the other hand, if no attribute is selected, then the Word may be determined as not having the privacy attributes.

The second method involves determining whether the application corresponding to the application interface has a predetermined plug-in or not. For example, the application interface may be a browser interface, and the corresponding application may be a browser. If a user determines that any interface displayed by the browser is a private application interface, a predetermined plug-in may be pre-installed in the browser. If the second electronic device detects a browser interface's corresponding browser contains the predetermined plug-in, then the browser may be determined to contain the privacy attributes. Subsequently, the second electronic device may control the plug-in in the browser and display a blocking image on the application interface of the browser.

In one embodiment, in response to the attention position corresponding to the user's line of sight not being on the physical display, an optical lens module may be used to display the one or more application interfaces prohibited from displaying on the physical device on the one or more virtual displays. As shown in FIG. 3b, application interface 314 may be on the physical display when the attention position corresponding to the user's line of sight is on the physical display. On the other hand, application interface 314 may be on the virtual display 32 when the attention position corresponding to the user's line of sight is not on the physical display.

In one embodiment, in response to the attention position corresponding to the user's line of sight not being on the physical display, and the attention position corresponding to the user's line of sight being on a target virtual display, display one or more application interfaces on the target virtual display that may be prohibited from displaying on the physical display.

Figure 4:
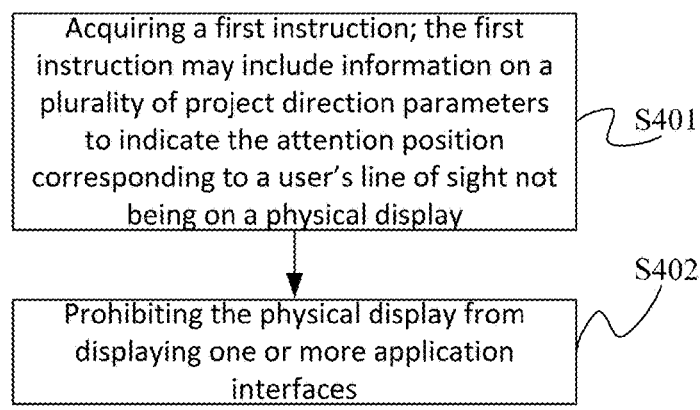
FIG. 4 is a flowchart illustrating the method for processing display contents in the second electronic device according to an embodiment of the present disclosure.

FIG. 4 is a flowchart illustrating the method for processing display contents in the second electronic device according to an embodiment of the present disclosure. The method includes the following steps.

Step S401, acquiring a first instruction. The first instruction may include information on one or more project direction parameters to indicate the attention position corresponding to a user's line of sight not being on a physical display.

Step S402, prohibiting the physical display from displaying one or more application interfaces.

The foregoing method may be implemented in many ways. The present disclosure provides the following non-limiting embodiments.

Figure 5:
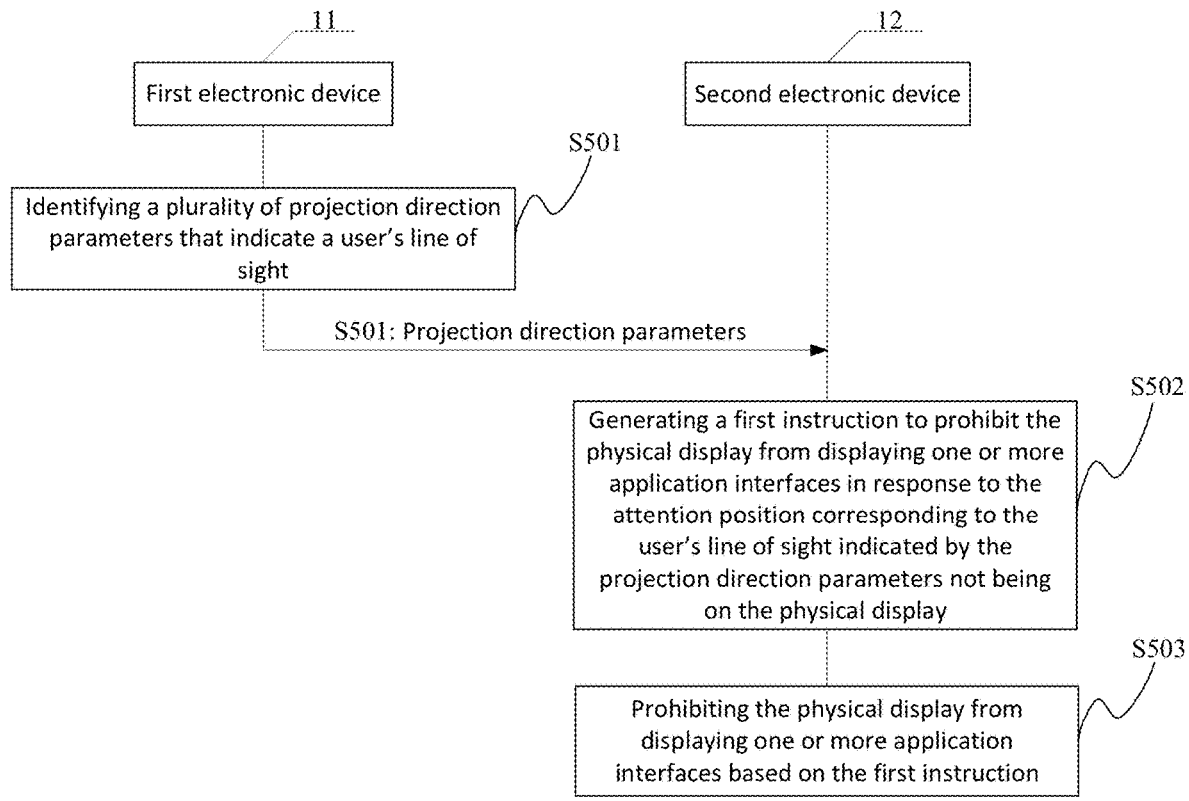
FIG. 5 is a signal diagram illustrating a method for processing display contents in the second electronic device according to another embodiment of the present disclosure.

A first embodiment is illustrated in FIG. 5 which is a signal diagram illustrating a method for processing display contents in the second electronic device according to another embodiment of the present disclosure. The method includes the following steps.

Step S501, the first electronic device 11 identifies one or more projection direction parameters that indicate the user's line of sight, and transmits the projection direction parameters to the second electronic device 12.

Step S502, the second electronic device 12 generates the first instruction in response to the attention position corresponding to the user's line of sight indicated by the projection direction parameters not being on the physical display.

Step S503, the second electronic device 12 prohibits the physical display from displaying one or more application interfaces based on the first instruction.

The first instruction may be used to instruct the physical display controlled by the second electronic device to enter a screen saver mode or a blank screen mode; or, the first instruction may be used to instruct the second electronic device to display a blocking image on the one or more application interfaces displayed on the physical display, or the first instruction may be used to instruct the second electronic device to display the blocking image on one or more private application interfaces with one or more privacy attributes displayed on the physical display.

In a second embodiment, the second electronic device 12 may acquire the first instruction from the first electronic device 11.

Reference may be made to FIG. 1 for the method of generating the first instruction using the first electronic device 11, and the details are not described here again.

In one embodiment, the first instruction may be used to instruct the second electronic device to display a blocking image on private application interfaces with privacy attributes on the physical display. In particular, the second electronic device 12 may generate a privacy protection instruction based on the first instruction and may further include:

Determining whether a private application interface with the privacy attributes is displayed on the physical display or not using the second electronic device 12. In response to the private application interface with the privacy attributes being displayed, generate the privacy protection instruction to display a blocking image on the private application interface with the privacy attributes. In response to the private application interface with the privacy attributes not being displayed, no action may be taken.

In one embodiment, since the first instruction may be generated and transmitted to the second electronic device 12 when the first electronic device 11 identifies the attention position corresponding to the user's line of sight is not on the physical display based on the projection direction parameters, the first instruction may only be applicable when a private application interface with the privacy attributes is displayed on the physical display of the second electronic device 12. The following method is provided to prohibit the first electronic device 11 from generating the first instruction when the private application interface with the privacy attributes is not displayed on the physical display of the second electronic device 12.

An embodiment of generating the first instruction in response to the attention position corresponding to the user's line of sight indicated by the projection direction parameters not being on the physical display is provided below.

The first electronic device 11 may acquire a privacy indication instruction from the second electronic device 12 in response to the attention position corresponding to the user's line of sight indicated by the projection direction parameters not being on the physical display. The privacy indication instruction may be used to indicate whether the physical display has one or more private application interfaces or not, and the first electronic device 11 may generate the first instruction in response to the privacy indication instruction indicating one or more private application interfaces being displayed on the physical display. Subsequently, upon receiving the first instruction, the second electronic device may control the physical display to display a blocking image on one or more private application interfaces.

In both embodiments, step S402 may further include generating a privacy protection instruction based on the first instruction, or the first instruction may be the privacy protection instruction; controlling the physical display to enter a screen saver mode or a blank screen mode based on the privacy protection instruction; or, displaying a blocking image on the application interfaces displayed on the physical display based on the privacy protection instruction. Furthermore, the method may include displaying a blocking image on the private application interfaces displayed on the physical display based on the privacy protection instruction.

References may be made to FIGS. 3b-3f for the use cases of the second electronic device prohibiting one or more application interfaces from displaying on the physical display, and details will not be repeated herein.

There are many methods for the second electronic device to determine whether an application interface displayed on the physical display is a private application interface or not. The present disclosure provides the following non-limiting methods:

The first method involves determining whether the application corresponding to the application interface contains one or more privacy attributes or not.

In one embodiment, displaying a blocking image on the private application interfaces displayed on the physical display based on the privacy protection instruction may further include identify one or more applications corresponding to the one or more application interfaces displayed on the physical display; identify the private application interfaces with one or more privacy attributes corresponding the applications from the one or more application interfaces; and displaying the blocking image on the private application interfaces.

For example, the application interface may be a Word application interface, and the corresponding application may be MS Word. The attributes of Word application may include a read-only attribute, a hidden attribute, and an encrypted attribute. If one or more of the attributes is selected, then the Word application may be determined to contain the privacy attributes. On the other hand, if no attribute is selected, then the Word application may be determined as not having the privacy attributes.

The second method involves determining whether the application corresponding to the application interface has a predetermined plug-in or not. For example, the application interface may be a browser interface, and the corresponding application may be a browser. If a user determines that any interface displayed by the browser is a private application interface, a predetermined plug-in may be pre-installed in the browser. If the second electronic device detects a browser interface's corresponding browser contains the predetermined plug-in, then the browser may be determined to contain the privacy attributes. Subsequently, the second electronic device may control the plug-in in the browser and display a blocking image on the application interface of the browser.

In one embodiment, the method for processing display contents in the second electronic device may further include acquiring a second instruction that may include information on the project direction parameters to indicate the attention position corresponding to the user's line of sight being on the physical display; and controlling the physical display to display one or more application interfaces.

The method for acquiring the second indication information may include the following non-limiting methods.

In a first method, the second instruction may be acquired from the first electronic device.

The first electronic device may generate the second instruction. Reference may be made to FIG. 1 for the method of generating the second instruction using the first electronic device, and the details will not be repeated herein.

In a second method, the second electronic device 12 may generate the second instruction by first acquiring the projection direction parameters that may be used to indicate the user's line of sight from the first electronic device. If the attention position corresponding to the user's line of sight as indicated by the projection direction parameters is on the physical display, then the second electronic device 12 may generate the second instruction.

In one embodiment, the method for processing display contents in the second electronic device may further include controlling the physical display to display a blocking image on the private application interface, or controlling the physical display to remain in the screen saver mode or the blank screen mode upon detecting the operation of moving the private application interface from the virtual display to the physical display. Further, the method may include controlling the physical display to cancel the displayed blocking image or controlling the physical display to be in a bright screen mode upon detecting the operation of moving the private application interface from the physical display to the virtual display.

Figure 6:
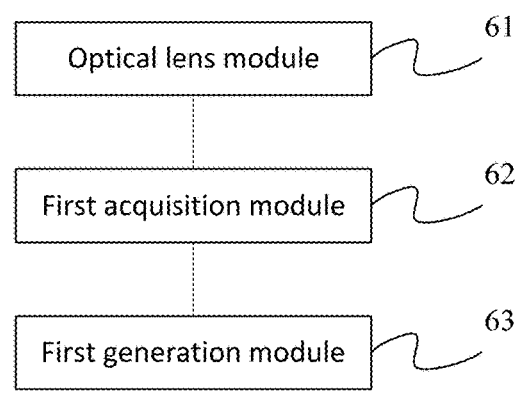
FIG. 6 is an illustration of the internal structure of the first electronic device according to an embodiment of the present disclosure.

FIG. 6 is an illustration of the internal structure of the first electronic device according to an embodiment of the present disclosure. The first electronic device includes:

An optical lens module 61 that can display one or more virtual displays.

A first acquisition module 62 that can acquire one or more projection direction parameters to indicate a user's line of sight.

A first generation module 63 that can generate a first instruction to prohibit the physical display from displaying one or more application interfaces in response to the attention position corresponding to the user's line of sight indicated by the projection direction parameters not being on the physical display.

In one embodiment, the first generation module 63 may include a first generation unit to generate the first instruction to instruct the physical display controlled by the second electronic device to enter a screen saver mode or a blank screen mode, or a second generation unit to generate the first instruction to instruct the second electronic device to display a blocking image on the application interfaces displayed on the physical display, or a third generation unit to generate the first instruction to instruct the second electronic device to display a blocking image on the private application interfaces with the privacy attributes displayed on the physical display.

In one embodiment, the first generation module 63 may further include a first acquisition unit to acquire a privacy indication instruction from the second electronic device in response to the attention position corresponding to the user's line of sight indicated by the projection direction parameters not being on the physical display. Further, the privacy indication instruction may be used to indicate whether the physical display has one or more private application interfaces or not. The first generation module 63 may further include a fourth generation unit to generate the first instruction in response to the privacy indication instruction indicating one or more private application interfaces is displayed on the physical display.

In one embodiment, the first acquisition module may include a second acquisition unit to acquire one or more projection directions and one or more position parameters of the user's eyeballs, and a third acquisition unit to acquire one or more position parameters and one or more rotation angles of the optical lens module.

In one embodiment, the first instruction may include information on the project direction parameters to indicate the attention position corresponding to the user's line of sight not being on the physical display. The first electronic device may further include a transmission module to transmit the first instruction to the second electronic device, which may generate a privacy protection instruction that prohibits the physical display from displaying one or more application interfaces.

In one embodiment, the first electronic device may further include a control module to control the optical lens module to display the one or more application interfaces prohibited from displaying on the physical device on the one or more virtual displays.

In one embodiment, the first electronic device may further include a second generation module to generate a second instruction to instruct the physical display controlled by the second electronic device to enter a bright screen mode in response to the attention position corresponding to the user's line of sight indicated by the projection direction parameters being on the physical display.

In one embodiment, the first electronic device may further include a third generation module to generate a second instruction to instruct the second electronic device to remove the blocking image displayed on the application interfaces on the physical display in response to the attention position corresponding to the user's line of sight indicated by the projection direction parameters being on the physical display.

In one embodiment, the first electronic device may further include a fourth generation module to generate a second instruction to instruct the second electronic device to remove the blocking image displayed on the private application interfaces with the privacy attributes on the physical display in response to the attention position corresponding to the user's line of sight indicated by the projection direction parameters being on the physical display.

In one embodiment, the first electronic device may further include a fifth generation module to generate a first instruction to instruct the second electronic device to display a blocking image on the private application interfaces with the privacy attributes on the physical display in response to the attention position corresponding to the user's line of sight indicated by the projection direction parameters being on the physical display.

Figure 7:
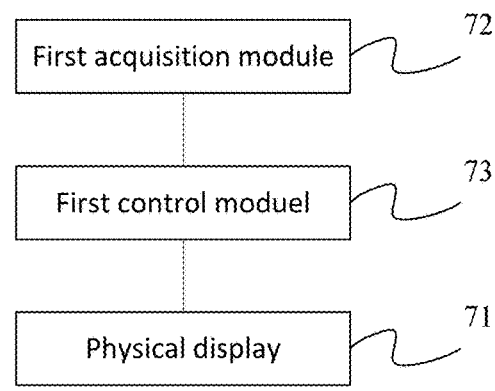
FIG. 7 is an illustration of the internal structure of the second electronic device according to an embodiment of the present disclosure.

FIG. 7 is an illustration of the internal structure of the second electronic device according to an embodiment of the present disclosure. The second electronic device includes:

A physical display 71 to display one or more application interfaces.

A first acquisition module 72 to acquire a first instruction. The first instruction may include information on one or more project direction parameters to indicate the attention position corresponding to a user's line of sight not being on the physical display, and the project direction parameters may be used to indicate the user's line of sight.

A first control module 73 to prohibit the physical display from displaying one or more application interfaces.

In one embodiment, the first acquisition module 72 may include a first acquisition unit to acquire the first instruction from the first electronic device. Further, the first acquisition module 72 may include a first generation unit to acquire the project direction parameters to indicate the attention position corresponding to a user's line of sight, and generate the first instruction in response to the attention position corresponding to a user's line of sight not being on the physical display. Furthermore, the first acquisition module 72 may include a receiving unit to transmit a privacy indication instruction to the first electronic device, where the privacy indication instruction may be used to indicate whether the physical display has one or more private application interfaces or not; acquiring the projection direction parameters that indicate the user's line of sight from the first electronic device may not be on the physical display; and, generate the first instruction in response to the privacy indication instruction indicating one or more private application interfaces being displayed on the physical display.

In one embodiment, the first control module 73 may further include a second generation unit to generate a privacy protection instruction based on the first instruction, or the first instruction may be the privacy protection instruction. The first control module 73 may further include a control unit to control the physical display to enter a screen saver mode or a blank screen mode based on the privacy protection instruction; or, control the physical display to display a blocking image on the application interfaces displayed on the physical display based on the privacy protection instruction; or, control the physical display to display the blocking image on the private application interfaces displayed on the physical display based on the privacy protection instruction.

In one embodiment, a control unit may be used to control the physical display to display a blocking image on the private application interfaces based on the privacy protection instruction. The control unit may include a first identification subunit to identify one or more applications corresponding to the one or more application interfaces displayed on the physical display; a second identification unit to identify the private application interfaces with one or more privacy attributes corresponding the applications from the one or more application interfaces; and a display subunit to display the blocking image on the private application interfaces.

In one embodiment, the second electronic device may further include a second acquisition module to acquire a second instruction that may include information on the project direction parameters to indicate the attention position corresponding to the user's line of sight being on the physical display; or a second control module to control the physical display to display one or more application interfaces.

Figure 8:
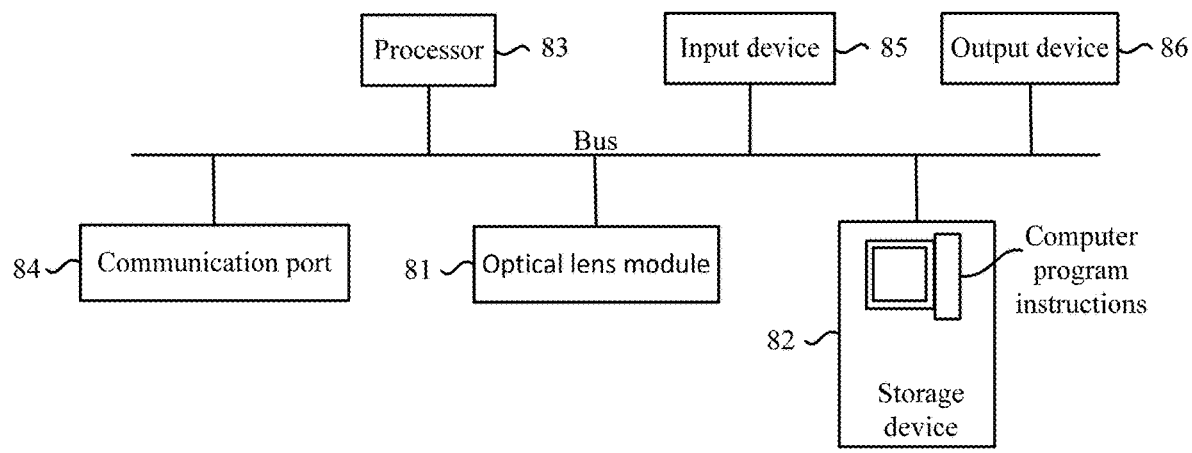
FIG. 8 is an illustration of the internal structure of the first electronic device according to another embodiment of the present disclosure.

FIG. 8 is an illustration of the internal structure of the first electronic device according to another embodiment of the present disclosure. The first electronic device includes:

An optical lens module 81 to display one or more virtual displays.

A storage device 82 to store computer program instructions.

A processor 83 to execute the computer program instructions. The computer program instructions may be used to acquire one or more projection direction parameters that indicate a user's line of sight; and generate a first instruction to prohibit the physical display from displaying one or more application interfaces in response to the attention position corresponding to the user's line of sight indicated by the projection direction parameters not being on the physical display.

In one embodiment, the first electronic device may further include a bus, a communication port 84, an input device 85, and an output device 86. The optical lens module 81, storage device 82, processor 83, communication port 84, input device 85, and output device 86 may be connected through the bus, where the bus may be a communication path between various components of the computer system.

In one embodiment, processor 83 may be a general-purpose central processing unit (CPU), a network processor (NP), a microprocessor, etc. Further, processor 83 may be an application-specific integrated circuit (ASIC), or one or more integrated circuits for controlling the execution of the computer program instructions of the present disclosure. Further, processor 83 may be a digital signal processor (DSP), an application specific integrated circuit (ASIC), an off-the-shelf programmable gate array (FPGA) or other programmable logic device, a discrete gate or transistor logic device, or a discrete hardware component.

In one embodiment, processor 83 may further include a main processor, and may also include a baseband chip, a modem, and the like.

In one embodiment, the storage device 82 may store computer program instructions for executing the embodiments provided in the present disclosure, and may further store an operating system and other application programs. Specifically, the computer program instructions may include program code, and the program code includes a computer operation instruction. More specifically, the storage device 82 may be a read-only memory (ROM), other types of static storage device that can store static information and instructions, a random access memory (RAM), other types of dynamic storage device that can store information and instructions, a magnetic disk memory, a flash, etc.

In one embodiment, the input device 85 may include a device for receiving data and information input from a user, for example, a keyboard, a mouse, a camera, a scanner, a light pen, a voice input device, a touchscreen, a pedometer, or a gravity sensor, etc.

In one embodiment, the output device 86 may include a device that may be allowed to output information to a user, for example, a display, a printer, or a speaker, etc.

In one embodiment, the communication port 84 may include any type of transceiver that may communicate with other devices or communication networks such as an Ethernet, a radio access network (RAN), a wireless local area network (WLAN), etc.

In one embodiment, processor 83 may execute the computer program instructions stored in the storage device 82 and use other devices to implement the various steps provided in the embodiments of the present disclosure.

Figure 9:
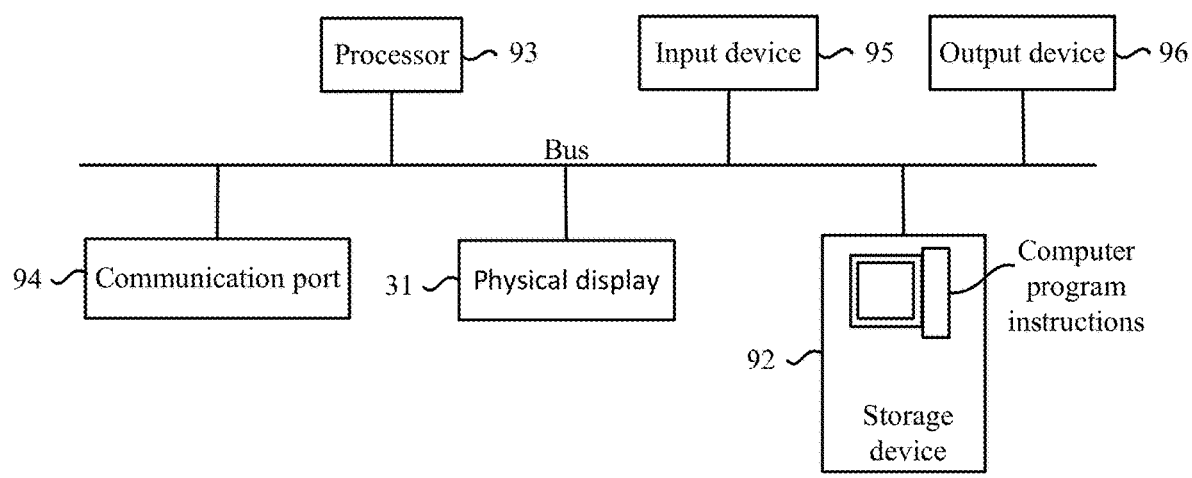
FIG. 9 is an illustration of the internal structure of the second electronic device according to another embodiment of the present disclosure.

FIG. 9 is an illustration of the internal structure of the second electronic device according to another embodiment of the present disclosure. The second electronic device includes:

A physical display 31 to display one or more application interface.

A storage device 92 to store computer program instructions.

A processor 93 to execute the computer program instructions. The computer program instructions may be used to acquire a first instruction, where the first instruction may include information on one or more project direction parameters to indicate the attention position corresponding to a user's line of sight not being on the physical display, and the project direction parameters may be used to indicate the user's line of sight; and prohibit the physical display from displaying one or more application interfaces.

In one embodiment, the second electronic device may further include a bus, a communication port 94, an input device 95, and an output device 96. Further, the physical display 31, storage device 92, processor 93, communication port 94, input device 95, and output device 96 may be connected through the bus, where the bus may be a communication path between various components of the computer system.

In one embodiment, processor 93 may be a general-purpose central processing unit (CPU), a network processor (NP), a microprocessor, etc. Further, processor 83 may be an application-specific integrated circuit (ASIC), or one or more integrated circuits for controlling the execution of the computer program instructions of the present disclosure. Further, processor 83 may be a digital signal processor (DSP), an application specific integrated circuit (ASIC), an off-the-shelf programmable gate array (FPGA) or other programmable logic device, a discrete gate or transistor logic device, or a discrete hardware component.

In one embodiment, processor 93 may further include a main processor, and may also include a baseband chip, a modem, and the like.

In one embodiment, the storage device 92 may store computer program instructions for executing the embodiments provided in the present disclosure, and may further store an operating system and other application programs. Specifically, the computer program instructions may include program code, and the program code includes a computer operation instruction. More specifically, the storage device 82 may be a read-only memory (ROM), other types of static storage device that can store static information and instructions, a random access memory (RAM), other types of dynamic storage device that can store information and instructions, a magnetic disk memory, a flash, etc.

In one embodiment, the input device 95 may include a device for receiving data and information input from a user, for example, a keyboard, a mouse, a camera, a scanner, a light pen, a voice input device, a touchscreen, a pedometer, or a gravity sensor, etc.

In one embodiment, the output device 96 may include a device that may be allowed to output information to a user, for example, a display, a printer, or a speaker, etc.

In one embodiment, the communication port 84 may include any type of transceiver that may communicate with other devices or communication networks such as an Ethernet, a radio access network (RAN), a wireless local area network (WLAN), etc.

In one embodiment, processor 93 may execute the computer program instructions stored in the storage device 92 and use other devices to implement the various steps provided in the embodiments of the present disclosure.

The embodiments of the present disclosure may further provide a readable storage medium, on which computer program instruction are stored. The computer program instructions may be executed by a processor, to implement the various steps related to the first electronic device provided in the embodiments of the present disclosure.

The embodiments of the present disclosure may further provide a readable storage medium, on which computer program instruction are stored. The computer program instructions may be executed by a processor, to implement the various steps related to the second electronic device provided in the embodiments of the present disclosure.

The embodiments in this specification are described in a progressive manner, each embodiment emphasizes a difference from the other embodiments, and the identical or similar parts between the embodiments may be made reference to each other. Since the apparatuses disclosed in the embodiments are corresponding to the methods disclosed in the embodiments, the description of the apparatuses is simple and relevant parts may be made reference to the description of the methods.

Persons skilled in the art may further realize that, units and steps of algorithms according to the description of the embodiments disclosed by the present disclosure can be implemented by electronic hardware, computer software, or a combination of the two. In order to describe interchangeability of hardware and software clearly, compositions and steps of the embodiments are generally described according to functions in the forgoing description. Whether these functions are executed by hardware or software depends upon specific applications and design constraints of the technical solutions. Persons skilled in the art may use different methods for each specific application to implement the described functions, and such implementation should not be construed as a departure from the scope of the present disclosure.

The steps of the methods or algorithms described in the embodiments of the present disclosure may be directly implemented by hardware, software modules executed by the processor, or a combination of both. The software module can be placed in a random access memory (RAM), memory, read only memory (ROM), electrically programmable ROM, electrically erasable and programmable ROM, register, hard disk, mobile disk, CD-ROM, or any other form of storage medium known to the technical domain.

It will be understood by those skilled in the art that the features described in the respective embodiments and/or claims of the present disclosure can be combined in various ways, even if such combinations are not explicitly described in the present disclosure. In particular, without departing from the spirit and teaching of the present disclosure, the features described in the respective embodiments and/or claims can be combined in various ways. All of these combinations fall within the scope of the present disclosure.

While the present disclosure has been shown and described with reference to various embodiments thereof, it will be understood by those skilled in the art that various modifications in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

It should be noted that the description of the foregoing embodiments of the electronic device may be similar to that of the foregoing method embodiments, and the device embodiments have the same beneficial effects as those of the method embodiments. Therefore, details may not be described herein again. For technical details not disclosed in the embodiments of the electronic device of the present disclosure, those skilled in the art may understand according to the method embodiments of the present disclosure.

In the several embodiments provided in the present disclosure, it should be understood that the disclosed device and method may be realized in other manners. The device embodiments described above are merely exemplary. All functional modules or units in the embodiments of the present disclosure may all be integrated in one processing unit, or each unit may be used as a single unit. Two or more units may be integrated in one. The above integrated unit can either be implemented in the form of hardware, or in the form of hardware combined with software functional units.

Persons of ordinary skill in the art should understand that, all or a part of steps of implementing the foregoing method embodiments may be implemented by related hardware of a computer instruction program. The instruction program may be stored in a computer-readable storage medium, and when executed, a processor executes the steps of the above method embodiments as stated above. The foregoing storage medium may include various types of storage media, such as a removable storage device, a read only memory (ROM), a random-access memory (RAM), a magnetic disk, or any media that stores program code.

Alternatively, when the above-mentioned integrated units of the present disclosure are implemented in the form of a software functional module being sold or used as an independent product, the integrated unit may also be stored in a computer-readable storage medium. Based on this understanding, the technical solutions provided by the embodiments of the present disclosure essentially or partially may be embodied in the form of a software product stored in a storage medium. The storage medium stores instructions which are executed by a computer device (which may be a personal computer, a server, a network device, or the like) to realize all or a part of the embodiments of the present disclosure. The above-mentioned storage medium may include various media capable of storing program codes, such as a removable storage device, a read only memory (ROM), a random-access memory (RAM), a magnetic disk, or an optical disk.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

The foregoing descriptions are merely embodiments of the present disclosure, and the protection scope of the present disclosure is not limited thereto. The scope that anyone skilled in the art may easily conceive changes and substitutions within the technical scope disclosed in the present disclosure that should be covered by the present disclosure. Therefore, the protection scope of the present disclosure should be subject to the scope of the claims as listed in the following.

Other embodiments of the disclosure will be apparent to those skilled in the art from consideration of the specification and practice of the disclosure provided herein. It is intended that the specification and examples be considered as exemplary only, with a true scope and spirit of the disclosure being indicated by the claims.

What is claimed is:

1. A method of displaying contents, comprising:
    providing a first electronic device configured to display one or more virtual contents to a user, wherein the first electronic device is communicable with and coupled to a second electronic device, which includes a physical display configured to display one or more non-virtual contents, and the one or more virtual contents is displayed to the user at a space that does not visually overlap with the physical display;
    determining the user's line of sight; and
    prohibiting the physical display of the second electronic device from displaying the one or more non-virtual contents, in response to the user's line of sight not being on the physical display of the second electronic device.

2. The method according to claim 1, wherein the prohibiting the physical display of the second electronic device from displaying the one or more non-virtual contents comprises one of the following:
    instructing the physical display to enter a screen saver mode or a blank screen mode; and
    instructing the second electronic device to display a blocking image on the physical display.

3. The method according to claim 1, further comprising:
    acquiring a privacy indication instruction from the second electronic device in response to determining the user's line of sight not being on the physical display of the second electronic device, wherein the privacy indication instruction indicating whether the physical display displays one or more private application interfaces; and
    prohibiting the physical display of the second electronic device from displaying the one or more non-virtual contents in response to the privacy indication instruction indicating one or more private application interfaces being displayed on the physical display of the second electronic device.

4. The method according to claim 1, further comprising:
    acquiring one or more position parameters and one or more rotation angles of the optical lens device;
    transmitting a first instruction to the second electronic device to generate a privacy protection instruction that prohibits the physical display of the second electronic device from displaying one or more application interfaces; and
    displaying the one or more application interfaces prohibited from being displayed on the physical device of the second electronic device on the one or more virtual displays.

5. The method according to claim 2, further comprising one of the following:
    instructing the physical display to enter a bright screen mode in response to the user's line of sight being on the physical display of the second electronic device; or,
    instructing the second electronic device to remove the blocking image displayed on the application interfaces on the physical display in response to the user's line of sight being on the physical display of the second electronic device; or,
    instructing the second electronic device to remove the blocking image displayed on the private application interfaces with the privacy attributes on the physical display in response to the user's line of sight being on the physical display of the second electronic device; or,
    instructing the second electronic device to display the blocking image on the private application interfaces with the privacy attributes on the physical display in response to the user's line of sight being on the physical display of the second electronic device.

6. A method for processing display contents, comprising:
    displaying one or more virtual displays using an optical lens device of a first electronic device, the first electronic device being communicable with and coupled to a second electronic device with a physical display, wherein the one or more virtual contents is displayed to the user at a space that does not visually overlap with the physical display;
    determining that a user's line of sight are on the physical display; and
    prohibiting the physical display of the second electronic device from displaying one or more application interfaces.

7. The method according to claim 6, further comprising:
    acquiring the projection direction parameters that indicate the user's line of sight from the first electronic device; and
    prohibiting the physical display of the second electronic device from displaying the one or more non-virtual contents, in response to the user's line of sight not being on the physical display.

8. The method according to claim 7, further comprising:
    transmitting a privacy indication instruction to the first electronic device, the privacy indication instruction indicating whether the physical display has one or more private application interfaces; and
    prohibiting the physical display of the second electronic device from displaying the one or more non-virtual contents, in response to the user's line of sight not being on the physical display and the privacy indication instruction indicating one or more private application interfaces displaying on the physical display; and
    generating a privacy protection instruction.

9. The method according to claim 8, wherein prohibiting the physical display of the second electronic device from displaying one or more application interfaces further includes one of the following:
    entering a screen saver mode or a blank screen mode based on the privacy protection instruction; or,
    displaying a blocking image on the application interfaces displayed on the physical display of the second electronic device based on the privacy protection instruction; or,
    displaying the blocking image on the private application interfaces displayed on the physical display of the second electronic device based on the privacy protection instruction.

10. The method according to claim 9, wherein displaying the blocking image on the private application interfaces displayed on the physical display of the second electronic based on the privacy protection instruction further includes:
- identifying one or more applications corresponding to the one or more application interfaces displayed on the physical display of the second electronic device;
- identifying the private application interfaces with one or more privacy attributes from the one or more application interfaces; and
- displaying the blocking image on the private application interfaces.

11. The method according to claim 10, further comprising one of the following:
- instructing the physical display of the second electronic device to enter a bright screen mode in response to the user's line of sight being on the physical display of the second electronic device; or,
- instructing the second electronic device to remove the blocking image displayed on the application interfaces on the physical display in response to the user's line of sight being on the physical display of the second electronic device; or,
- instructing the second electronic device to remove the blocking image displayed on the private application interfaces with the privacy attributes on the physical display in response to the user's line of sight being on the physical display of the second electronic device; or,
- instructing the second electronic device to displaying the blocking image on the private application interfaces with the privacy attributes on the physical display in response to the user's line of sight being on the physical display of the second electronic device.

12. The method according to claim 10, further comprising:
- receiving a second instruction that includes information on the project direction parameters indicating the user's line of sight being on the physical display of the second electronic device; and
- displaying one or more application interfaces.

13. An electronic device, coupled to and communicable with a second electronic device having a physical display configured to display one or more non-virtual contents, wherein the electronic device comprises:
- a processor; and
- an optical lens device coupled to the processor, wherein the optical lens device is configured to display one or more virtual contents to the user at a space that does not visually overlap with the physical display,
- wherein the optical lens device is configured to determine a user's line of sight; and in response to the user's line of sight not being on the physical display of the second electronic device, the processor is operable to prohibit the physical display of the second electronic device from displaying the one or more non-virtual contents.

14. The electronic device according to claim 13, wherein the processor is further configured to:
- instruct the second electronic device to enter a screen saver mode or a blank screen mode on the physical display of the second electronic device; or,
- instruct the second electronic device to display a blocking image on the physical display of the second electronic device; or,
- instruct the second electronic device to display the blocking image on one or more private application interfaces with one or more privacy attributes displayed on the physical display of the second electronic device.

15. The electronic device according to claim 13, wherein the processor is further configured to:
- acquire a privacy indication instruction from the second electronic device in response to the user's line of sight not being on the physical display, wherein the privacy indication instruction indicates whether the physical display displays of the second electronic device one or more private application interfaces or not; and
- prohibit the physical display of the second electronic device from displaying the one or more non-virtual contents, in response to the privacy indication instruction indicating one or more private application interfaces being displayed on the physical display.

16. The electronic device according to claim 13, wherein the processor is further configured to:
- acquire one or more projection directions and one or more position parameters of the user's eyeballs;
- transmit the first instruction to the second electronic device to generate a privacy protection instruction that prohibits the physical display of the second electronic device from displaying one or more application interfaces; and
- display the one or more application interfaces on the one or more virtual displays.

17. The electronic device according to claim 14, wherein the processor is further configured to:
- instruct the physical display to enter a bright screen mode in response to the user's line of sight being on the physical display; or,
- instruct the second electronic device to remove the blocking image displayed on the application interfaces on the physical display in response to the user's line of sight being on the physical display; or,
- instruct the second electronic device to remove the blocking image displayed on the private application interfaces with the privacy attributes on the physical display in response to the user's line of sight being on the physical display; or,
- instruct the second electronic device to display the blocking image on the private application interfaces with the privacy attributes on the physical display in response to the user's line of sight being on the physical display.

* * * * *